United States Patent
Ehlen

(10) Patent No.: US 10,413,870 B2
(45) Date of Patent: Sep. 17, 2019

(54) CERAMIC MULTILAYER FILTER MEMBRANE

(71) Applicant: MANN+HUMMEL GMBH, Ludwigsburg (DE)

(72) Inventor: Frank Ehlen, Neunkirchen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 239 days.

(21) Appl. No.: 15/361,056

(22) Filed: Nov. 24, 2016

(65) Prior Publication Data

US 2017/0072370 A1  Mar. 16, 2017

Related U.S. Application Data

(63) Continuation of application No. PCT/EP2015/060422, filed on May 12, 2015.

(30) Foreign Application Priority Data

May 27, 2014 (DE) .................. 10 2014 007 665

(51) Int. Cl.
*B01D 69/08* (2006.01)
*B01D 71/02* (2006.01)
*B01D 69/12* (2006.01)
*B01D 61/14* (2006.01)

(52) U.S. Cl.
CPC ........... *B01D 71/025* (2013.01); *B01D 61/14* (2013.01); *B01D 69/08* (2013.01); *B01D 69/12* (2013.01); *B01D 71/02* (2013.01)

(58) Field of Classification Search
CPC ...... B01D 71/025; B01D 61/14; B01D 71/02; B01D 69/08; B01D 69/12
See application file for complete search history.

(56) References Cited

U.S. PATENT DOCUMENTS

| 5,716,526 | A | * | 2/1998 | Kelemen | A61K 9/1277 210/483 |
| 5,810,912 | A | | 9/1998 | Akiyama et al. | |
| 2010/0251888 | A1 | * | 10/2010 | Fekety | B01D 53/228 95/54 |
| 2013/0087502 | A1 | * | 4/2013 | Blumer | C02F 1/444 210/652 |
| 2017/0225128 | A1 | * | 8/2017 | Votaw | B01D 71/027 |

FOREIGN PATENT DOCUMENTS

| KR | 20090017000 A | 2/2009 |
| WO | 2008016292 A1 | 2/2008 |
| WO | 2010028330 A1 | 3/2010 |

* cited by examiner

*Primary Examiner* — Chester T Barry
(74) *Attorney, Agent, or Firm* — James Hasselbeck

(57) ABSTRACT

A filter membrane of a multi-layer configuration for filtration of a medium is provided with at least one first layer that has as a main component an oxide ceramic material and is provided with at least one second layer that has as a main component a non-oxide ceramic material. The first layer is a carrier layer and the second layer is a separation layer that filters the medium and generates a retentate and a permeate.

23 Claims, 1 Drawing Sheet

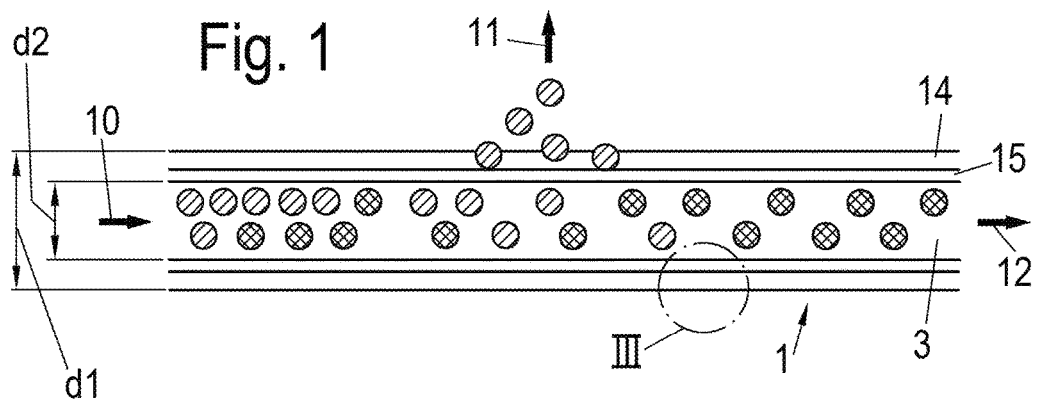
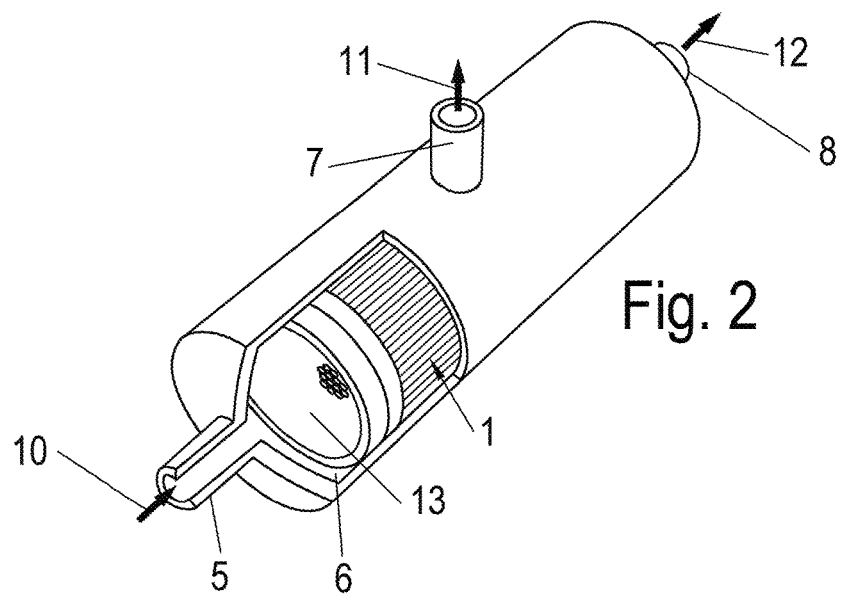
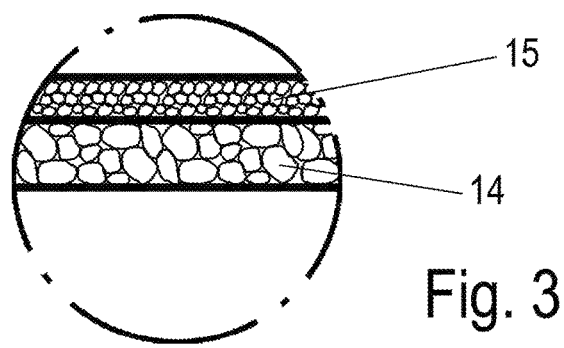

CERAMIC MULTILAYER FILTER MEMBRANE

CROSS-REFERENCE TO RELATED APPLICATIONS

This application is a continuation application of international application No. PCT/EP2015/060422 having an international filing date of 12 May 2015 and designating the United States, the international application claiming a priority date of 27 May 2014, based on prior filed German patent application No. 10 2014 007 665.2, the entire contents of the aforesaid international application and the aforesaid German patent application being incorporated herein by reference.

BACKGROUND OF THE INVENTION

The present invention concerns a filter membrane of a multi-layer configuration for filtration of a medium, a hollow fiber comprising the filter membrane, and a filter module.

US 2010/0112267 A1 discloses a single-layer hollow fiber membrane for filtration of gases. This hollow fiber membrane is comprised of porous material.

DE 10 2005 008 900 A1 discloses a filter module with a plurality of hollow fibers. These hollow fibers are comprised of ceramic material. The hollow fiber membrane can be of a multi-layer configuration, in particular of several potting compounds.

DE 10112863 C1 discloses a filter module of ceramic $Al_2O_3$ green fibers.

Also, multi-layer ceramic hollow fibers are known which are formed of oxide ceramic materials, for example, of $Al_2O_3$. These fibers however clog gradually so that the diffusion flow is impaired.

Moreover, hollow fibers are known which are formed of non-oxide ceramic material. However, these must be produced very expensively. In case of silicon carbide hollow fiber membranes, they are produced at firing temperatures of more than 2,000° C. with exclusion of oxygen.

It is thus the object of the present invention to provide a filter membrane, a hollow fiber, and a filter module that can be produced inexpensively and exhibit better filtering properties in comparison to oxide ceramic hollow fibers.

SUMMARY OF THE INVENTION

This object is solved by a filter membrane for filtration of a medium that comprises at least one first layer which comprises as a main component an oxide ceramic material and that comprises at least one second layer which as a main component comprises a non-oxide ceramic material comprises at least one first layer.

A filter membrane for filtration of a medium is of a multi-layer configuration. It comprises at least one first layer. The main component of this first layer is an oxide ceramic material. The filter membrane comprises also at least one second layer which comprises as main component a non-oxide ceramic material.

The filter membrane can be produced in a simple and inexpensive way and exhibits excellent filtering properties. It can be formed in various geometric configurations, for example, as a planar or curved flat element or, particularly preferred, as a hollow fiber.

Advantageous properties are subject matter of the dependent claims.

Preferably, more than 60% by weight of the first layer are formed of oxide ceramic materials. Also, preferably more than 60% by weight of the second layer are formed of a non-oxide ceramic material. However, depending on the field of application, further materials for improving the material properties can be contained in the first and/or in the second layer.

The filter membrane can comprise also further layers. For example, between the first and the second layer a connecting layer can be arranged which compensates different thermal expansion coefficients of the first and the second layer or adapt the pore size between the support and the membrane. For example, the first layer can have a very large pore size into which the material of the second layer can penetrate. However, this is undesirable and can be prevented by the intermediate layer.

With regard to production technology, it is however particularly advantageous to construct the filter membrane only of the two aforementioned layers.

The first layer of the filter membrane can be designed in particular as a carrier layer. It provides a mechanical strength of the filter membrane, in particular of the hollow fiber. The second layer can be designed as a separation layer for filtration of the medium with generation of a retentate and of a permeate. The second layer can be arranged in this context immediately on the first layer.

The first layer can advantageously comprise further additives for improving the material properties of this layer. This may vary depending on the field of application. When filtering hot media, between the layers different material expansion may occur. The additives can enable an adaptation of the thermal expansion coefficient to the second layer. Alternatively or additionally, they can also improve the mechanical strength of the first layer. Preferably, these additives are contained with up to 20% by weight in the material of the first layer. The additives can be oxide ceramic $SiO_2$ particles of any size or nanoscale oxide ceramic particles, in particular in a range of smaller than 100 nm.

The first layer can be comprised to at least 75% by weight of an oxide ceramic material.

The oxide ceramic material can preferably be selected from the following materials: $Al_2O_3$, $ZrO_2$, $TiO_2$, $Y_2O_3$ and/or $SiO_2$. These materials or mixtures of these materials exhibit an advantageous strength so that the filter membrane, in particular the hollow fiber, has a good strength and pressure stability. Moreover, the oxide ceramic material may comprise additives, preferably in the form of alkaline and/or alkaline earth oxide compounds.

The second layer can preferably comprise further additives in order to improve the material properties of the second layer depending on the field of application. These can be in this context additional hard materials for improving the mechanical strength of the second layer. These additives are preferably contained with up to 20% by weight in the material of the second layer. The additive can be preferably an oxidic ceramic, in particular a zirconium(IV) oxide or boehmite. Boehmite is a mixed structure of oxides and hydroxides of aluminum. Such oxide ceramic proportions of the second layer may be generated not until sintering in or on the ceramic layer that, prior to sintering, is exclusively non-oxidic. This can be caused, on the one hand, in that oxidation of the non-oxide ceramic material during sintering takes place under incomplete exclusion of oxygen and, on the other hand, in that oxides of the first layer diffuse into the second layer. The proportion of oxide ceramic particles in the second layer is in this context in particular in the single-digit percentage range, i.e., is less than 10%, preferably less than 3%, particularly preferred less than 1% (relative to weight proportions). Of course, a diffusion of non-oxide ceramic components from the second into the first layer is conceivable also.

The additives of the first as well as of the second layer are advantageously embodied as nanoscale particles, in particular with a mean particle diameter on average of less than 100 nm, particularly preferred of 5 nm-50 nm. Additives with appropriate mean particle sizes are commercially available. A particle size analysis can be realized alternatively by means of laser light scattering, for example, with a nanoparticle analyzer of the company Retsch (Horiba SZ-100). This enables incorporation by firing without oxygen exclusion without sintering and compaction of the layers taking place. Typical sintering temperatures above 1,000° C. are therefore advantageously avoided in manufacturing these filter membranes and hollow fibers.

The non-oxide ceramic material can preferably be a nitride and/or a carbide. Preferably, it can be selected from the following materials: SiC, $Si_3N_4$, AlN and/or BN. The nitrides and carbides, in particular the aforementioned materials, are excellently suited as filter membrane material and exhibit good separation properties.

For a membrane according to the invention that can be produced inexpensively and has a long service life, it is advantageous to use exclusively non-oxide ceramic material for producing the second layer so that the second layer after sintering with the aforementioned limitations substantially, and preferably exclusively, is comprised of non-oxide ceramic material. In this context it is preferred that the second layer is embodied as a separation layer for filtration of a medium with generation of a retentate and of a permeate.

In the same way, for an efficient production it is advantageous when for producing the first layer exclusively oxide ceramic material is employed so that in analogy it is comprised substantially, and preferably exclusively, of oxide ceramic material. It is preferred in this context that the first layer is designed as a carrier layer.

A hollow fiber according to the invention comprises a fiber wall. The latter is embodied as a filter membrane of the kind described herein. This means basically that a filter membrane according to the invention is designed as a hollow fiber.

Occasionally, in the prior art a differentiation is made between hollow fibers and capillary fibers. The term hollow fiber, in accordance with the present invention, encompasses in this context also the aforementioned capillary fibers.

Preferably, a hollow fiber according to the invention can have an inner diameter of 0.2 mm to 5.0 mm.

The fiber wall can preferably have a wall thickness of 0.02 mm to 1.5 mm.

It is advantageous when the second layer has a ratio of the average layer thickness relative to the average pore size of smaller than 2,500:1, preferably smaller than 1,000:1, in particular of 500:1 to 50:1. Mercury porosimeters, which measure pore size even in the range below 10 nm and are therefore suitable for pore size analysis, are known from various manufacturers, for example, Quantachrome Instruments and Micromeritics.

The separation layer is advantageously smaller than the carrier layer. The ratio of wall thickness of the filter membrane to wall thickness of the second layer can be greater than 3:1, preferably greater than 8:1, in particular greater than 10:1. The layer thicknesses and their configuration can be analyzed, for example, by means of GDOES spectroscopy (Glow Discharge Optical Emission Spectroscopy). Minimal fluctuation ranges of individual devices of different manufacturers are already taken into account in the range specifications.

In this context, the second layer can be preferably a medium-contacting layer which forms the inner periphery of the hollow fiber.

The filtration of the medium through the hollow fiber can preferably be realized such that medium can be supplied into the interior or cavity of the hollow fiber and such that the permeate is discharged to the exterior through the fiber wall. This permeate can be collected outside of the lumen of the hollow fiber and discharged.

However, a configuration of a hollow fiber with reverse filtration direction can be realized also in the context of the invention so that the permeate is collected within the lumen of the hollow fiber and is discharged through the cavity of the hollow fiber. This is possible, for example, when outside of the hollow fiber a high pressure is existing and/or when within the hollow fiber a vacuum or low pressure is applied. In this case, the second layer, as medium-contacting layer, can form the outer layer of the fiber wall of the hollow fiber.

A filter module according to the invention for filtration of a medium comprises a plurality of hollow fibers according to the invention. This filter module exhibits substantially improved filtering properties in comparison to a filter module with an oxide ceramic separation layer. In particular, the separation layer in case of use for several hours, even for several days, will clog to a much lesser degree in comparison to an oxide ceramic separation layer. Accordingly, the filter module according to the invention has the advantage that it exhibits at least on the first day of a long-term use a higher diffusion flow than a filter module with hollow fibers with an oxide ceramic separation layer.

The hollow fibers according to the invention, in particular as an arrangement in a filter module, can be used for filtration of so-called produced water, of process water, for water treatment, for surface water treatment, for wastewater treatment and recycling, for filtration applications in the food industry and beverage industry as well as in the chemical industry and biotechnology and medical technology, in particular for blood filtration, and in automotive applications, in particular for water/oil separation.

Produced water is a term of the art in the oil and gas industry. It refers to water which is a byproduct of oil and natural gas production, for example, also in fracking. It can have sometimes even higher viscosities than normal water. Also, in case of oil production, for example, oil drilling and production of oil, huge quantities of contaminated water are produced. This is also referred to in the art as produced water.

BRIEF DESCRIPTION OF THE DRAWINGS

A preferred embodiment variant of the invention will be explained in the following with the aid of the Figures in more detail.

FIG. 1 shows a schematic illustration of the separation principle of a hollow fiber membrane.

FIG. 2 shows a filter module of several hollow fiber membranes.

FIG. 3 is a detail view of a hollow fiber according to the invention.

DESCRIPTION OF PREFERRED EMBODIMENTS

In membrane technology, different filter media can be used which, inter alia, can be differentiated in regard to geometries but also in regard to materials. For example, flat membranes (discs or polymer films) and hollow fiber membranes are known inter alia. In connection with materials, ceramic and polymeric membranes are known inter alia. Hollow fibers can be designed as partially permeable structures. The fiber wall or individual layers of the fiber wall of the hollow fiber can act in this context as filter membrane.

In the following, in FIGS. 1 to 3 a preferred embodiment of hollow fibers is illustrated. The subject matter of the invention is however not limited to the fiber wall of hollow fibers as filter element but can also be used as filter membrane, for example, for flat filters or other filter elements. The filter membrane or at least the carrier layer can be embodied also as a multi-channel element or a honeycomb body, in addition to the embodiment as a hollow fiber or flat membrane.

FIG. 1 shows a hollow fiber 1 according to the invention for filtration of a medium. The medium to be filtered is a fluid and may comprise one or several components. It can be a gas or particularly preferred a liquid. The liquid can be laden with solids or can contain one or several immiscible liquids which are separated from the medium by the hollow fiber or the fiber wall.

A typical example of a medium which contains an immiscible liquid is a water/oil mixture. The permeate, for example, water, penetrates the separation layer. The retentate, for example, the oil, is conveyed in the hollow fiber. The retentate exits at the end from the hollow fiber interior.

This hollow fiber 1 comprises at least one cylindrical fiber wall 2 and one or several cavities 3 contained therein. The hollow fiber can be referred to also as a capillary membrane or hollow-core yarn. It serves for filtering a medium or a medium mixture. The medium or medium mixture 10 to be filtered can be introduced into the hollow fiber and the filtered medium, the permeate 11, can exit through the wall of the hollow fiber and solid or liquid ingredients contained in the medium can be retained at the inner wall of the membrane as a retentate 12.

The hollow fiber 1 illustrated in FIG. 1 comprises preferably an inner diameter d2 which on average amounts to more than 50% of the outer diameter d1, particularly preferred more than 70% of the outer diameter d1, in particular more than 85% of the outer diameter d1 of the hollow fiber.

For effective filtration, the wall thickness of the fiber wall 2 of the hollow fiber 1 is preferably between 20 µm-1,500 µm, particularly preferred between 100 µm-500 µm.

Corresponding filter modules for the use as water filter have preferably a plurality of the aforementioned fibers 1 wherein their average outer diameter is preferably smaller than 5 mm, particularly preferred between 2.5 mm to 3.5 mm. FIG. 2 shows the schematic configuration of such a filter module 4.

The inner diameter of the fibers 1 can be preferably for the use as water filter, for example, for produced water, in a range between 1.5 mm to 2.3 mm, in particular between 1.8 mm to 2.0 mm.

The corresponding filter module 4 may comprise at least one supply line 5 for a medium 10 to be filtered as well as an interior 6, if need be with appropriate discharge line 7 for the permeate 11, and a discharge line 8 for the retentate 12. The interior of the example of a filter module illustrated in FIG. 2 serves, on the one hand, for collecting and discharging the permeate as well as for bundling the hollow fiber membranes. For building filter modules for use in water filters, for example, hollow fibers with a length of preferably between 10 cm and more than 100 cm can be combined to modules and at both ends can be potted to prevent leakage from occurring between permeate and retentate side.

The filtration path of the medium 10 to be filtered is preferably from the interior to the exterior. In this context, the medium 10 passes, for example, through a first end face 13 of the fibers into the tubular cavity 3 of the hollow fiber 1. The permeate 11, i.e., the purified medium, exits through the porous fiber wall 2 of the hollow fiber 1 and can be collected outside of the fibers. Usually, this is realized in a housing interior of the filter housing from which the permeate 11 is then discharged from a filter module. The medium which is remaining within the cavity 3 is enriched with the residues which have not passed the fiber wall 2, the so-called retentate. This composition of medium and retentate 12 is discharged at the opposite second end face.

However, in the context of the present invention, hollow fibers can also be realized that have a filtration path from the exterior to the interior.

FIG. 3 shows a detail view of the fiber wall 2 of the hollow fiber 1 of FIG. 1.

The fiber wall 2 of the hollow fiber 1 is comprised of at least two layers in accordance with the invention. However, further layers may be supplemented. This encompasses, for example, an intermediate layer in order to enable a better joining of the two other layers and/or in order to enable an adaptation of the pore sizes. This intermediate layer can be comprised particularly preferred of an oxide or non-oxide ceramic material.

The first layer 14 is based on an oxide ceramic material. This first layer 14 forms preferably the carrier layer in this context. The oxide ceramic proportions are the main component, preferably with more than 60% by weight, of the material of this layer. Further auxiliary components may be contained. Preferred oxide ceramic materials are selected for the first layer from the following materials: $Al_2O_3$, $ZrO_2$, $TiO_2$, $Y_2O_3$, $SiO_2$ or mixtures thereof. Particularly preferred is $Al_2O_3$. Additionally, the oxide ceramic material may contain also alkaline and/or alkaline earth oxides.

In addition, a second layer 15 is provided as a component of the fiber wall 2. It can be arranged on the first layer 14. It is based on a non-oxide ceramic material. The non-oxide ceramic proportions are the main component, preferably with more than 60% by weight, of the material of this layer 15.

It is also possible that further components, also of oxide ceramic nature, are contained as auxiliary components in the second layer 15. Such auxiliary components serve for improving the fracture strength and reducing the brittleness of this layer. In this context, a zirconium oxide additive can be used, for example. These oxide ceramic proportions can be particularly preferred of a nanoscale embodiment. The oxide ceramic proportions are particulate and can have an average diameter of less than 100 nm, in particular of 5 nm to 50 nm, in a particularly preferred embodiment variant. The size of the particulate proportions can be incorporated during manufacture of the hollow fibers at lower temperatures. Greater particles of oxide ceramic components would have higher firing temperatures for solidification of the carbide-based or nitride-based ceramic second layer which, in the presence of oxygen, would lead to an undesirable conversion, for example, of SiC, to glass and would cause loss of filtering properties. Therefore, if it is desired to add oxide ceramic proportions to the second layer, it is recommended to use nanoscale particles of the oxide ceramic additives.

Preferred non-oxide ceramics for the second layer are selected from nitride and carbide compounds, particularly preferred selected from the following materials: SiC, $Si_3N_4$, AlN and/or BN. Especially preferred is silicon carbide—SiC.

The second layer 15 can be applied onto the first layer 14 by means of a wet-chemical method and can be subsequently hardened.

The second layer 15 serves preferably as a separation layer. This separation layer is preferably the medium-contacting layer within the hollow fibers. This separation layer, for example, of SiC, can be used, for example, for the separation of natural organic substances (NOM—natural organic matter), for example, an oil water mixture. In this context, a significantly reduced fouling tendency and better cleaning properties in comparison to separation layers on the basis of oxide ceramic materials can be observed. A possible explanation for this can reside in the strongly hydrophilic properties of the non-oxide ceramic layer 15, for example, of SiC, as well as in the fact that the ceramic layer, for example, SiC, as a result of the location of the isoelectric point (at pH 2-3) is negatively charged across a wide pH range and therefore the often also negatively charged organic substances are repelled, which counteracts the generation of a fouling layer and at the same time also increases the retention degree of these substance.

Due to the characteristic course of the surface potential, for example, of an SiC separation layer as a function of the pH value, the hollow fiber membrane can also be used for filtration in other fields of application, for example, in applications of medical technology, for example, in the filtration of blood for obtaining blood plasma etc.

Due to the combination of a non-oxide ceramic-based first layer with an oxide ceramic-based second layer as fiber material wall of a hollow fiber, the afore described advantages with regard to membrane performance are combined with the cost advantages in the production of oxide ceramic carriers.

The obtainable performance increase can be demonstrated impressively with the example of an oil/water separation in the context of process water treatment. The process water used in the test has an oil concentration of approximately 6,000 ppm. Under same processing parameters, after a filtration duration of one day the diffusion flow of the membrane with the SiC separation layer and an aluminum oxide ceramic carrier layer is four times that of a comparable oxide ceramic aluminum oxide hollow fiber membrane with aluminum oxide separation layer. After three days, the diffusion flow is still twice as high as the diffusion flow of the hollow fiber with aluminum oxide separation layer.

Moreover, the $Al_2O_3$ hollow fiber with the oxide ceramic separation layer in the present case must be back-flushed every 3 hours for at least 10 seconds at 3.5 bar for maintaining the flow. In contrast thereto, the $SiC/Al_2O_3$ membrane in the considered time period of 3 days must neither be back-flushed nor cleaned in other ways. The oil retention for both membranes is >99.5%.

The hollow fiber membrane according to the invention can be used in the form of a filter module in particular for produced water treatment, process water treatment, water treatment in general, surface water treatment, drinking water treatment, wastewater treatment and recycling, filtration applications in the food industry and beverage industry as well as chemical industry and biotechnology and medical technology, for example, for blood filtration.

Particularly preferred, a filter module with the hollow fiber membranes according to the invention can be used in automotive applications, in particular for water/oil separation.

The afore described hollow fibers can preferably exhibit a high thermal resistance, in particular a thermal resistance up to 500° C. or higher. Thus, the hollow fibers are suitable also for fields of application such as steam pressure sterilizations and hot gas filtrations.

An individual fiber has a sufficient functionality in particular even for a shock load of 10G and of 68 million load changes.

The porosity of the fiber wall (2) or of the filter membrane can be adjusted upon selection of the materials. In a preferred embodiment variant, the porosity of the first layer, i.e., the carrier layer, can be 25%-50% and the porosity of the second layer, i.e., the separation layer, can be 20%-60%.

While specific embodiments of the invention have been shown and described in detail to illustrate the inventive principles, it will be understood that the invention may be embodied otherwise without departing from such principles.

What is claimed is:

1. A filter membrane of a multi-layer configuration for filtration of a medium, the filter membrane comprising:
   at least one first layer mostly comprised of an oxide ceramic material;
   at least one second layer mostly comprised of a non-oxide ceramic material,
   wherein the at least one first layer comprises one or more additives,
   wherein the one or more additives are selected from the group consisting of $SiO_2$ and nanoscale oxide ceramic particles and wherein the one or more additives are contained with up to 20% by weight in the at least one first layer.

2. The filter membrane according to claim 1, wherein the at least one first layer is a carrier layer and wherein the at least one second layer is a separation layer configured to filter the medium and generate a retentate and a permeate, wherein the separation layer is arranged immediately on the at least one first layer.

3. The filter membrane according to claim 2, wherein the at least one first layer is exclusively comprised of the oxide ceramic material.

4. The filter membrane according to claim 2, wherein the at least one second layer is exclusively comprised of the non-oxide ceramic material.

5. The filter membrane according to claim 1, wherein the oxide ceramic material is selected from the group consisting of aluminum(III) oxide ($Al_2O_3$), zirconium(IV) oxide ($ZrO_2$), titanium(IV) oxide ($TiO_2$), yttrium(III) oxide ($Y_2O_3$), and silicon dioxide ($SiO_2$), and combinations thereof.

6. The filter membrane according to claim 1, wherein the non-oxide ceramic material is selected from the group consisting of nitride, carbide, and a combination of nitride and carbide.

7. The filter membrane according to claim 6, wherein the carbide is silicon carbide (SiC) and wherein the nitride is selected from the group consisting of silicon nitride ($Si_3N_4$), aluminum nitride (AlN), and cubic boron nitride (BN), and combinations thereof.

8. A filter membrane of a multi-layer configuration for filtration of a medium, the filter membrane comprising:
   at least one first layer mostly comprised of an oxide ceramic material;
   at least one second layer mostly comprised of a non-oxide ceramic material,
   wherein the at least one first layer comprises one or more additives, wherein the one or more additives are configured to adapt a thermal expansion coefficient of the at least one first layer to a thermal expansion coefficient of the at least one second layer or to improve a mechanical strength of the at least one first layer.

9. A filter membrane of a multi-layer configuration for filtration of a medium, the filter membrane comprising:
- at least one first layer mostly comprised of an oxide ceramic material;
- at least one second layer mostly comprised of a non-oxide ceramic material,
- wherein the at least one first layer comprises one or more additives,
- wherein the one or more additives are nanoscale particles,
- wherein the nanoscale particles have a particle size with an average diameter of smaller than 100 nm.

10. A filter membrane of a multi-layer configuration for filtration of a medium, the filter membrane comprising:
- at least one first layer mostly comprised of an oxide ceramic material;
- at least one second layer mostly comprised of a non-oxide ceramic material,
- wherein the at least one second layer comprises one or more additives,
- wherein the one or more additives are configured to increase a material strength of the at least one second layer.

11. The filter membrane according to claim 10, wherein the one or more additives are contained with up to 20% by weight in the at least one second layer.

12. The filter membrane according to claim 10, wherein the one or more additives are an oxide ceramic material.

13. The filter membrane according to claim 12, wherein the oxide ceramic material is zirconium(IV) oxide ($ZrO_2$) or boehmite.

14. The filter membrane according to claim 10, wherein the one or more additives are nanoscale particles, wherein the nanoscale particles have a particle size with an average diameter of smaller than 100 nm.

15. A filter membrane of a multi-layer configuration for filtration of a medium, the filter membrane comprising:
- at least one first layer mostly comprised of an oxide ceramic material;
- at least one second layer mostly comprised of a non-oxide ceramic material,
- wherein the at least one layer has a ratio of a layer thickness of the at least one second layer to a pore size of the at least one second layer of less than 2,500:1.

16. The filter membrane according to claim 15, wherein the ratio is in a range from 500:1 to 50:1.

17. A filter membrane of a multi-layer configuration for filtration of a medium, the filter membrane comprising:
- at least one first layer mostly comprised of an oxide ceramic material;
- at least one second layer mostly comprised of a non-oxide ceramic material,
- wherein a ratio of a wall thickness of the filter membrane to a wall thickness of the at least one second layer is greater than 3:1.

18. The filter membrane according to claim 17, wherein the ratio is greater than 10:1.

19. The filter membrane according to claim 17, wherein the filter membrane is embodied as a hollow fiber.

20. The filter membrane according to claim 19, wherein the filter membrane forms an inner fiber wall or an outer fiber wall of the hollow fiber.

21. The filter membrane according to claim 19, wherein the filter membrane forms an inner fiber wall and an outer fiber wall of the hollow fiber.

22. The filter membrane according to claim 19, configured to be employed in process water filtration; drinking water treatment; surface water treatment; wastewater treatment and recycling; filtration applications in food industry, beverage industry, chemical industry, biotechnology, and medical technology; and automotive applications.

23. A filter module for filtration of a medium, comprising a plurality of the filter membrane according to claim 19, wherein the filter module is configured to be employed in process water filtration; drinking water treatment; surface water treatment; wastewater treatment and recycling; filtration applications in food industry, beverage industry, chemical industry, biotechnology, and medical technology; and automotive applications.

* * * * *